(12) United States Patent
Haeusler et al.

(10) Patent No.: US 11,927,438 B2
(45) Date of Patent: Mar. 12, 2024

(54) METHODS AND SYSTEMS FOR CALIBRATING FIDUCIAL MARKERS RELATIVE TO AN OBJECT

(71) Applicant: The Boeing Company, Chicago, IL (US)

(72) Inventors: Phillip Haeusler, Chicago, IL (US); Alexandre Desbiez, Chicago, IL (US)

(73) Assignee: The Boeing Company, Arlington, VA (US)

( * ) Notice: Subject to any disclaimer, the term of this patent is extended or adjusted under 35 U.S.C. 154(b) by 766 days.

(21) Appl. No.: 16/732,480

(22) Filed: Jan. 2, 2020

(65) Prior Publication Data
US 2021/0207957 A1    Jul. 8, 2021

(51) Int. Cl.
*G01B 21/04* (2006.01)
*B25J 9/16* (2006.01)
*G01B 11/00* (2006.01)
*G06T 7/73* (2017.01)

(52) U.S. Cl.
CPC .......... *G01B 21/042* (2013.01); *B25J 9/1692* (2013.01); *B25J 9/1694* (2013.01); *G01B 11/002* (2013.01); *G06T 7/73* (2017.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 5,551,429 | A * | 9/1996 | Fitzpatrick | G06T 7/33 606/130 |
| 9,964,765 | B2 * | 5/2018 | Gardiner | G02B 27/017 |
| 10,088,294 | B2 * | 10/2018 | Moteki | G06T 7/73 |
| 2004/0002642 | A1 * | 1/2004 | Dekel | G01B 11/26 600/407 |

(Continued)

OTHER PUBLICATIONS

Kato (Marker Tracking and HMD Calibration for a Video-based Augmented Reality Conferencing System Hirokazu Kato; Proceedings of the 2nd IEEE and ACM International Workshop on Augmented Reality '99, pp. 85-94, Oct. 20-21, 1999 San Francisco) (Year: 1999).*

*Primary Examiner* — Arleen M Vazquez
*Assistant Examiner* — Brandon J Becker
(74) *Attorney, Agent, or Firm* — McDonnell Boehnen Hulbert & Bergoff LLP (57) ABSTRACT

In an example, a method for calibrating fiducials relative to a workpiece is disclosed and involves receiving, from one or more cameras, images of the fiducials, each image acquired from a different camera pose, where the fiducials comprise (i) one or more first fiducials fixed at one or more unknown locations on the workpiece and (ii) calibration fiducials disposed at known locations on the workpiece; estimating poses of the fiducials, where estimating the poses of the fiducials comprises, in each image, estimating, for each fiducial visible in the image, a pose of the fiducial relative to the camera(s); formulating a pose graph comprising nodes for the images and for the fiducials, the poses estimated for the fiducials, the calibration fiducials as landmarks with known poses, and constraints between the calibration fiducials and the images; and solving the pose graph to determine poses of the first fiducial(s) that satisfy the constraints.

20 Claims, 6 Drawing Sheets

(56) References Cited

U.S. PATENT DOCUMENTS

| | | | |
|---|---|---|---|
| 2004/0104935 A1* | 6/2004 | Williamson | G06V 10/10 |
| | | | 715/757 |
| 2010/0303337 A1* | 12/2010 | Wallack | B25J 9/1697 |
| | | | 348/47 |
| 2014/0050375 A1* | 2/2014 | Baker | A61B 34/20 |
| | | | 382/128 |
| 2015/0112645 A1* | 4/2015 | Zeisl | G06T 7/33 |
| | | | 703/1 |
| 2016/0214255 A1* | 7/2016 | Uhlenbrock | B25J 9/1674 |
| 2017/0000581 A1* | 1/2017 | Tokuda | G06V 10/40 |
| 2017/0054954 A1* | 2/2017 | Keitler | G06V 20/20 |
| 2018/0289982 A1* | 10/2018 | Sayeh | G16H 20/40 |
| 2019/0364206 A1* | 11/2019 | Dal Mutto | H04N 5/23238 |

* cited by examiner

METHODS AND SYSTEMS FOR CALIBRATING FIDUCIAL MARKERS RELATIVE TO AN OBJECT

FIELD

The present disclosure relates generally to fiducial marker calibration, and more particularly, to processes for calibrating the pose of fiducial markers relative to an object.

BACKGROUND

Robotic devices, augmented reality (AR) devices, and other similar devices are becoming more involved in the manufacturing process of various physical objects, or "workpieces," such as aircraft components. In order for such a device to perform work on or otherwise interact with an object in an environment, such as machining the object or sanding the object, the object's pose (e.g., the object's position and orientation relative to a reference coordinate system, such as a global reference frame) with respect to the device is registered with the device.

To accomplish this, existing systems often use camera-based methods to correlate the real world (e.g., the object in an environment) with the virtual world (e.g., a three-dimensional (3D) representation of the object in the environment), so that any robotic device or human wearing an AR device can have an accurate determination of where the object actually is in the environment. This can also help determine whether the object has been properly machined according to a specification. Typically, existing methods involve using special physical features on the object, such as fiducials (also referred to as "fiducial markers"), which are physical features placed in the field of view of an imaging system (e.g., a camera system) that are used as a point of reference or measure. In order to use fiducial markers for the purpose of registering an object's pose, existing methods often run a calibration routine to determine where the fiducial markers are placed in the environment relative to the object.

Existing calibration routines typically involve using laser trackers or other scanning equipment to scan the entire object. However, existing techniques for precise calibration can be difficult and may not be robust to changes in certain manufacturing environments. For example, existing laser tracking methods often require highly reflective features (e.g., laser balls) to be temporarily mounted to the object at precise locations and often use physically actuated lasers that allow precise control of laser beams. Further, existing laser trackers/scanners (e.g., triangulation lasers) can be very expensive and the calibration process for existing laser tracking methods can be time consuming (e.g., approximately four hours to calibrate).

What is needed is a less expensive and more efficient technique for calibrating fiducial markers relative to an object.

SUMMARY

In an example, a calibration system for calibrating fiducial markers relative to a workpiece is described. The calibration system comprises the workpiece, the fiducial markers, one or more cameras, and a processor. The fiducial markers comprise (i) one or more first fiducial markers fixed at one or more unknown locations on the workpiece and (ii) a plurality of calibration fiducial markers disposed at a plurality of known locations on the workpiece. The one or more cameras are configured to acquire a set of images of the fiducial markers, each image acquired from a different camera pose of a plurality of camera poses. The processor is configured to receive, from the one or more cameras, the set of images. The processor is also configured to estimate poses of the fiducial markers, where estimating the poses of the fiducial markers comprises, in each image of the set of images, estimating, for each fiducial marker that is visible in the image, a pose of the fiducial marker relative to the one or more cameras. The processor is also configured to formulate a pose graph comprising (i) nodes for the set of images and for the fiducial markers, (ii) the poses estimated for the fiducial markers, (iii) the plurality of calibration fiducial markers as landmarks with known poses, and (iv) a set of constraints comprising constraints between the plurality of calibration fiducial markers and the set of images. The processor is also configured to solve the pose graph to determine poses of the one or more first fiducial markers that satisfy the set of constraints.

In another example, a method for calibrating fiducial markers relative to a workpiece is described. The method involves receiving, by a processor, from one or more cameras, a set of images of the fiducial markers, each image acquired from a different camera pose of a plurality of camera poses, where the fiducial markers comprise (i) one or more first fiducial markers fixed at one or more unknown locations on the workpiece and (ii) a plurality of calibration fiducial markers disposed at a plurality of known locations on the workpiece. The method also involves estimating, by the processor, poses of the fiducial markers, where estimating the poses of the fiducial markers comprises, in each image of the set of images, estimating, for each fiducial marker that is visible in the image, a pose of the fiducial marker relative to the one or more cameras. The method also involves formulating, by the processor, a pose graph comprising (i) nodes for the set of images and for the fiducial markers, (ii) the poses estimated for the fiducial markers, (iii) the plurality of calibration fiducial markers as landmarks with known poses, and (iv) a set of constraints comprising constraints between the plurality of calibration fiducial markers and the set of images. The method also involves solving, by the processor, the pose graph to determine poses of the one or more first fiducial markers that satisfy the set of constraints.

In another example, a non-transitory computer readable medium having stored thereon instructions, that when executed by one or more processors of a computing device, cause the computing device to perform operations is described. The operations comprise receiving, from one or more cameras, a set of images of fiducial markers, each image acquired from a different camera pose of a plurality of camera poses, where the fiducial markers comprise (i) one or more first fiducial markers fixed at one or more unknown locations on a workpiece and (ii) a plurality of calibration fiducial markers disposed at a plurality of known locations on the workpiece. The operations also comprise estimating poses of the fiducial markers, where estimating the poses of the fiducial markers comprises, in each image of the set of images, estimating, for each fiducial marker that is visible in the image, a pose of the fiducial marker relative to the one or more cameras. The operations also comprise formulating a pose graph comprising (i) nodes for the set of images and for the fiducial markers, (ii) the poses estimated for the fiducial markers, (iii) the plurality of calibration fiducial markers as landmarks with known poses, and (iv) a set of constraints comprising constraints between the plurality of calibration fiducial markers and the set of images. The operations also comprise solving the pose graph to determine poses of the one or more first fiducial markers that satisfy the set of constraints.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Unless otherwise specifically noted, a "pose" of a camera, fiducial marker, or other object consists of six degrees-of-freedom in 3D space (e.g., x, y, z, roll, pitch, and yaw).

In order to project two-dimensional (2D) image points into 3D object points, such as points corresponding to a workpiece or other object within an environment, the properties of the camera must be known. These properties are known as the camera's intrinsic parameters, which can include focal length, principal point, and image sensor size, among other possibilities. Further, for accurate projection from 2D to 3D, distortion effects of the camera's lens should also be modelled. Consequently, a distortion model with distortion coefficients can be included as part of the camera's intrinsic parameters.

Camera calibration can be performed to estimate the camera's intrinsic parameters. As discussed above, a technique for such calibration typically involves capturing various images of fiducial markers. The fiducial markers will primarily be described herein as taking a form similar to a rectangular or square checkerboard pattern, which are easily detectable and thus provide, in each image, a desirable quantity of 2D points to project to corresponding places in 3D.

To improve over existing processes, described herein are methods and systems for accurate calibration of fiducial markers relative to a workpiece or other type of object on which the fiducial markers are located. Calibration of the fiducial markers can involve estimating, and then optimizing, and thus solving for, the pose of the fiducial markers relative to the workpiece. The optimized pose of the fiducial markers can be used to optimize the intrinsic parameters described above. Thus, a more accurate calibration of the fiducial markers can lead to a more accurate estimation of the intrinsic parameters of the camera(s) that acquired images of the fiducial markers.

The fiducial markers used in the disclosed method and system include one or more first fiducial markers and a plurality of calibration fiducial markers. The one or more first fiducial markers are fixed at one or more unknown locations on the workpiece on the workpiece. The plurality of calibration fiducial markers are disposed at known locations on the workpiece. An "unknown location" of a particular first fiducial marker is a location, orientation, etc. of the first fiducial marker that is unknown to the computing device or other computing devices—that is, in performing the disclosed methods, the computing device(s) does/do not have data stored that indicates to the computing device(s) what the location, orientation, etc. is for the first fiducial marker relative to the workpiece. A "known location" of a particular calibration fiducial marker is a location, orientation, etc. of the calibration fiducial marker is a location, orientation, etc. of the calibration fiducial marker that is known to the computing device or other computing devices—that is, in performing the disclosed methods, the computing device(s) has/have data stored that indicates to the computing device(s), to some degree, what the location, orientation, etc. is for the calibration fiducial marker relative to the workpiece. For example, the computing device might have stored a 3D model of the workpiece that shows the locations where the plurality of calibration fiducial markers can be placed, attached, etc. on the workpiece. Other examples of unknown or known locations are possible as well.

Furthermore, the first fiducial marker(s) are "fixed" in the sense that each such first fiducial marker can be fastened or otherwise attached to the workpiece and intended for a more permanent use compared to the plurality of calibration fiducial markers. By contrast, the plurality of calibration fiducial markers are "disposed" at known locations on the workpiece in the sense that each such calibration fiducial marker can be coupled to the workpiece in a more temporary manner than the one or more first fiducial markers. For example, the plurality of calibration fiducial markers can be attached to dowels and the dowels are then placed into existing datum holes (e.g., dowel holes) of the workpiece. Once calibration is complete, the plurality of calibration fiducial markers can be removed from the workpiece (e.g., by removing the dowels from the datum holes), whereas the one or more first fiducial markers can be left fastened to the workpiece and subsequently used (e.g., by a robotic device or AR device) for performing tasks associated with the workpiece (e.g., moving, sanding, painting, etc. the workpiece).

Although the term "fixed" is used with respect to the first fiducial markers, it should be understood that such fiducial markers could be removed at a later point in time, such as after certain tasks associated with the workpiece have been completed. Furthermore, other techniques for fixing, disposing, and/or removing fiducial markers to/from the workpiece are possible as well.

In the disclosed method, one or more cameras can acquire a set of images of the fiducial markers, where each image is acquired from a different camera pose of a plurality of camera poses. To facilitate this, a computing device or devices of the disclosed system (e.g., computing device(s) having a processor and memory and configured to control operation of the robotic device and the lasers/sensors associated therewith) can control the one or more cameras to acquire the set of images and send the set of images to the computing device, or can receive the set of images from the one or more cameras without specifically requesting or controlling the one or more cameras to do so. After receiving the set of images, the computing device estimates, in each image, a pose of each fiducial marker relative to the one or more cameras. The computing device then formulates and solves a pose graph to determine the poses of the one or more first fiducial markers that satisfy certain constraints. In particular, the computing device formulates, and then solves, a pose graph that includes (i) nodes for the set of images and for the fiducial markers, (ii) the poses estimated for the fiducial markers, (iii) the plurality of calibration fiducial markers as landmarks with known poses, and (iv) a set of constraints comprising constraints between the plurality of calibration fiducial markers and the set of images.

The disclosed method and system improves over existing solutions in both speed and complexity. For instance, use of a laser tracker for calibration can take up to four hours, whereas the disclosed method can be performed in approximately ten minutes. To facilitate this, the plurality of calibration fiducial markers can be disposed at the known locations on the workpiece, after which calibration software can be run on the computing device to output the optimized poses of at least the one or more first fiducial markers.

These and other improvements are described in more detail below. Implementations described below are for purposes of example. The implementations described below, as well as other implementations, may provide other improvements as well.

Figure 1:
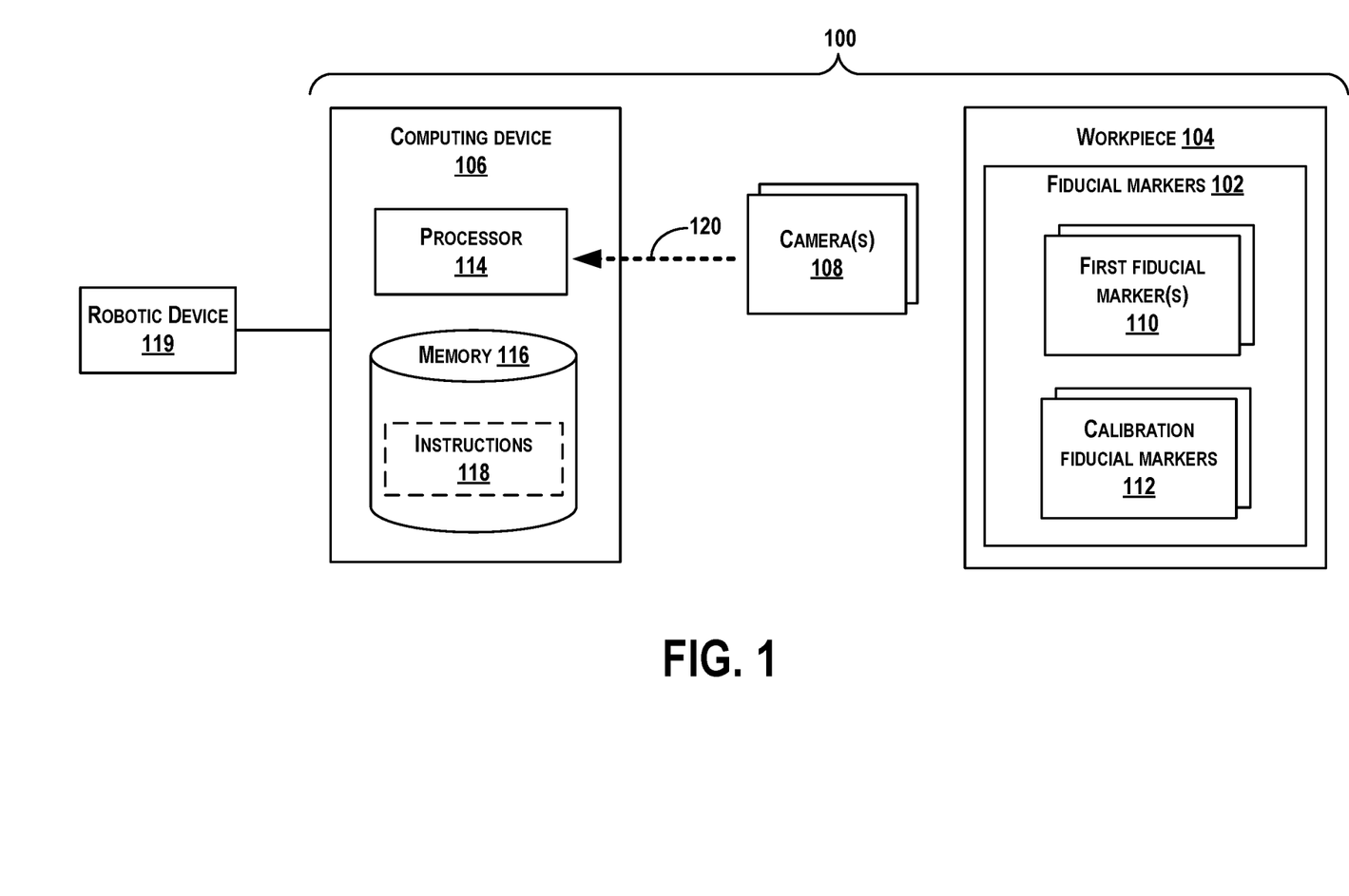
FIG. 1 depicts a system for use in calibrating fiducial markers relative to a workpiece, according to an example implementation.

Referring now to the figures, FIG. 1 is an example of a system 100 for use in calibrating fiducial markers 102 relative to an object, where a workpiece 104 is shown as an example of such an object. As shown, the system 100 includes the workpiece 104, the fiducial markers 102, a computing device 106, and one or more cameras 108. The fiducial markers 102 is shown to include one or more first fiducial markers 110 and a plurality of calibration fiducial markers 112. The computing device 106 is shown to include a processor 114, a memory 116, and instructions 118 for execution by the processor 114. The block in FIG. 1 that represents the fiducial markers 102 is included within the block representing the workpiece 104 because, as described above, the fiducial markers 102 can be temporarily disposed, or more permanently fixed, at locations on the workpiece 104. FIG. 1 also includes a block representing an example robotic device 119 with which the computing device 106 can communicate.

Figure 2:
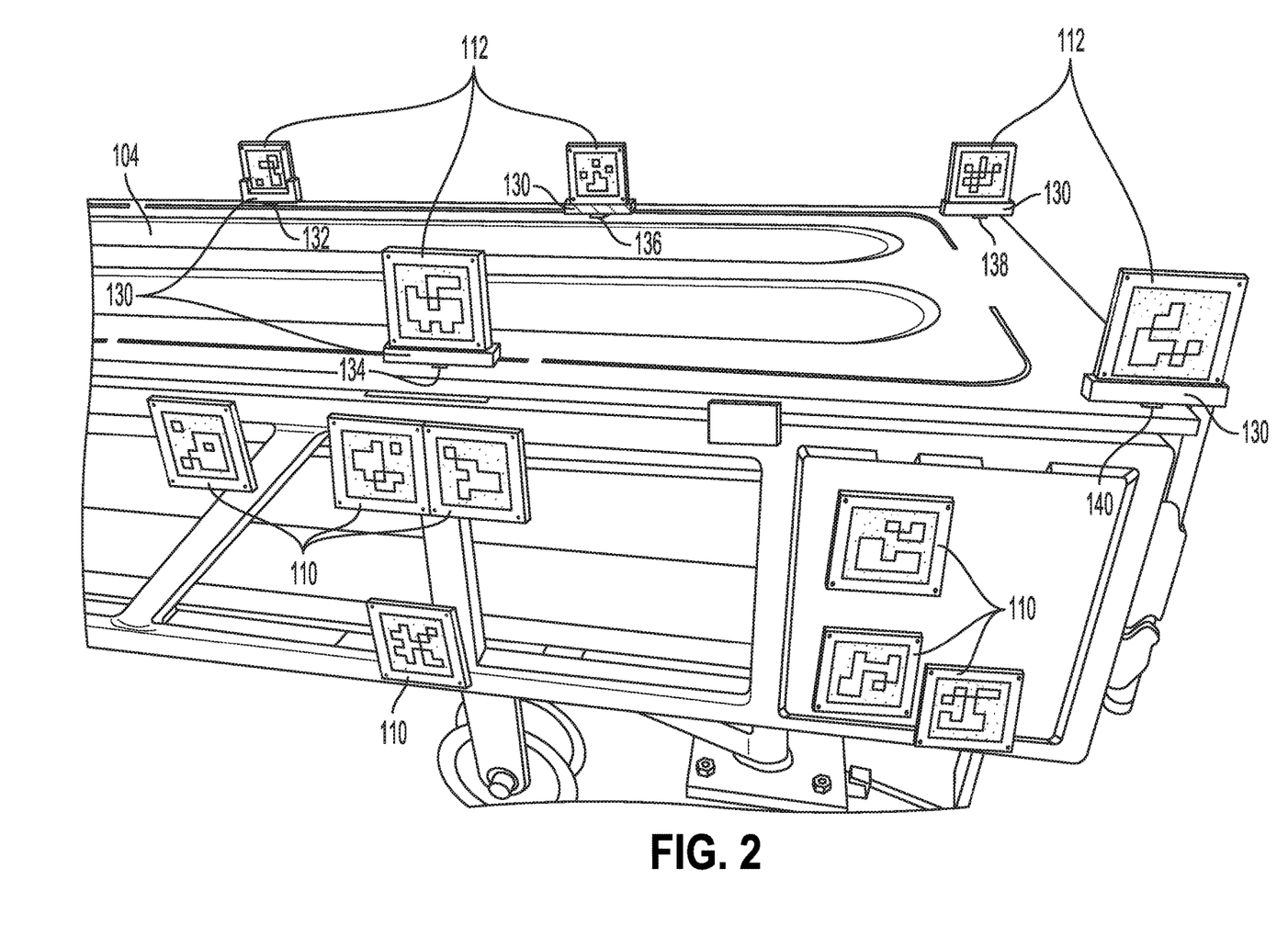
FIG. 2 depicts a workpiece and fiducial markers, according to an example implementation.
Figure 3:
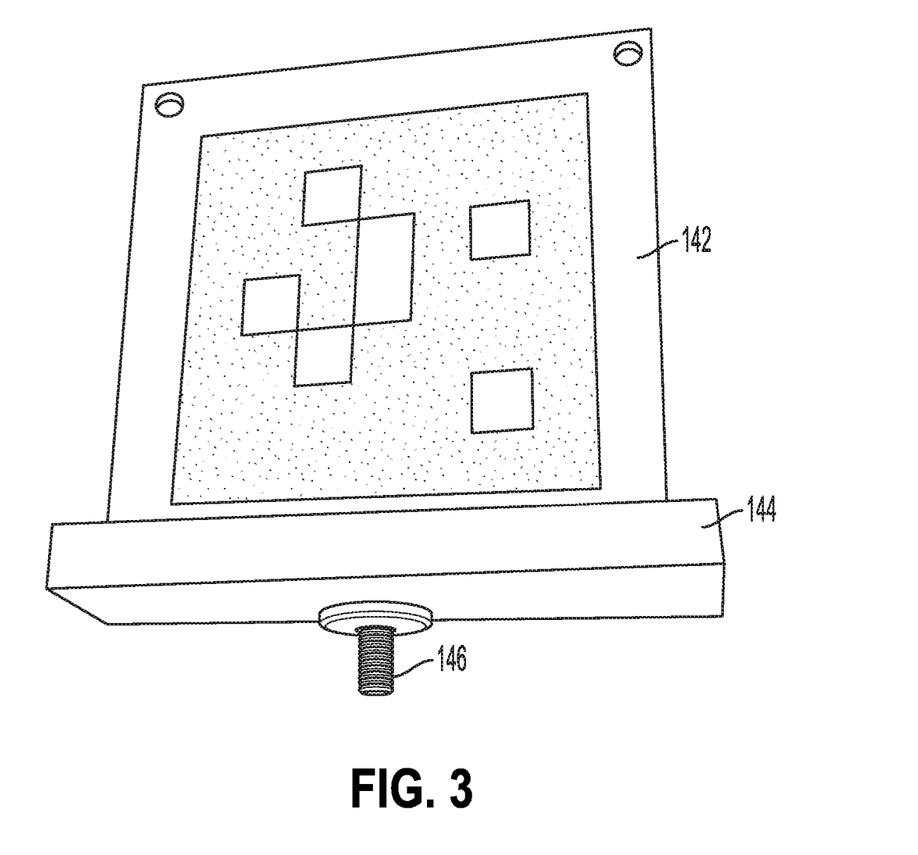
FIG. 3 depicts a fiducial marker, according to an example implementation.

As discussed above, the fiducial markers 102 can take the form of special physical features that are recognizable by the computing device 106 and usable as reference points and/or measurements. For example, one or more of the fiducial markers 102 can take the form of a machine-readable label, such as a checkerboard pattern or the like, that can be attached to another physical object, such as a metal plate or sheet. Each of the one or more first fiducial markers 110 and each of the plurality of calibration fiducial markers 112 are shown in FIGS. 2 and 3 as checkerboard patterns. However, it should be understood that any one or more of the fiducial markers 102, including any one or more of the one or more first fiducial markers 110 and any one or more of the plurality of calibration fiducial markers 112, can be a different type of fiducial marker that can be used for calibration. In some examples, all of the fiducial markers 102 can be the same type of fiducial marker. Alternatively, one or more of the fiducial markers 102 can be of a different type of fiducial marker than one or more other fiducial markers.

The workpiece 104 can take the form of an object that is observable, and perhaps manipulatable (e.g., moved, cut, machined, etc.), in an environment by humans, a robotic device, and/or other equipment. For example, the workpiece 104 can be an object used in the manufacturing of an aircraft or other vehicle, such as a layup mandrel tool used for the fabrication of composite parts (e.g., for an aircraft). Alternatively, the workpiece 104 can be any other type of object that components of the system 100 (e.g., the one or more cameras 108) or components outside the system 100 (e.g., a robotic device) can observe, and perhaps manipulate, in the environment.

The computing device 106 can take the form of a client device (e.g., a computing device that is actively operated by a user), a server, or some other type of computational platform. In some examples, the computing device 106 can take the form of a desktop computer, laptop computer, tablet computer, smartphone, wearable computing device (e.g., AR glasses), or other type of device. The computing device 106 can be included as part of the robotic device (e.g., an onboard computing system) or as a separate device from the robotic device (e.g., a server or global system configured to manage performance of operations by the robotic device or across multiple robotic devices). The computing device 106 can be in communication with the one or more cameras 108. As such, the computing device 106 can receive the set of images 120 from the one or more cameras 108.

The one or more cameras 108 can be any type of camera configured to acquire images of an environment. The one or more cameras 108 can be operated by a human (e.g., a handheld or other portable form of a camera), can be mounted to a robotic device, such as a mobile robot (e.g., on wheels), placed on a tripod and moved across different locations when acquiring the set of images, and/or can be fixed at different locations in the environment of the workpiece 104.

The one or more first fiducial markers 110 and the plurality of calibration fiducial markers 112 can take any of the forms described above and/or described herein with respect to FIG. 2 and FIG. 3.

The processor 114 can be a general-purpose processor or special purpose processor (e.g., a digital signal processor, application specific integrated circuit, etc.). As noted above, the processor 114 is configured to execute the instructions 118 (e.g., computer-readable program instructions including computer executable code) that are stored in the memory 116 and are executable to provide various operations described herein. In alternative examples, the computing device 106 can include additional processors that are configured in the same manner.

The memory 116 can take the form of one or more computer-readable storage media that can be read or accessed by the processor 114. The computer-readable storage media can include volatile and/or non-volatile storage components, such as optical, magnetic, organic or other memory or disc storage, which can be integrated in whole or in part with the processor 114. The memory 116 is considered non-transitory computer readable media. In some examples, the memory 116 can be implemented using a single physical device (e.g., one optical, magnetic, organic or other memory or disc storage unit), while in other examples, the memory 116 can be implemented using two or more physical devices.

In some embodiments, the system 100 can include the robotic device 119 that is tasked with performing operations associated with the workpiece 104. The robotic device 119 can take the form of a mobile or stationary robot with physical components (e.g., a manipulator, such as an arm and/or gripper) as well as software components that enable the robotic device 119 to perform operations associated with the workpiece 104. The robotic device 119 can be configured to operate in an autonomous mode, a partially autonomous mode where some robotic operations are controlled by a human operator, or a mode in which the robotic device 119 is controlled entirely by a human operator. The robotic device 119 can include power source(s) (e.g., a battery) configured to supply power to various components of the robotic device 119. As an example, the robotic device 119 can be a mobile robot having wheels and at least one mechanical arm. In some examples, one or more robotic devices may use different modes of transportation besides wheels on the ground. For instance, one or more robotic devices may be airborne (e.g., drones), and may be used for tasks such as moving objects or collecting data (e.g., laser scans, camera images, etc.) of the workpiece 104 and/or a surrounding environment of the workpiece 104. In some embodiments, the robotic device can include the one or more cameras 108 (e.g., mounted to one or more locations on the robotic device 119). Example operations that the robotic device 119 can be controlled to perform include, but are not limited to, acquiring images of the workpiece 104 (e.g., via the one or more cameras 108), moving the workpiece 104, or performing other interactions with the workpiece 104 (e.g., sanding, painting, cleaning, the workpiece 104), among other possibilities.

FIG. 2 depicts an example of the workpiece 104, as well as examples of the one or more first fiducial markers 110 and the plurality of calibration fiducial markers 112. In particular the system 100 of FIG. 1 can include a plurality of brackets 130, where each bracket is configured to hold one of the plurality of calibration fiducial markers 112, as shown. Further, each bracket of the plurality of brackets 130 has a dowel (shown more specifically in FIG. 3) configured for insertion into a datum hole disposed in the workpiece 104, such as datum hole 132, datum hole 134, datum hole 136, datum hole 138, and datum hole 140. As so arranged, the plurality of brackets 130 can be disposed in the datum holes in the workpiece 104. The locations of the datum holes are known, and thus the locations of the plurality of calibration fiducial markers 112 disposed in the datum holes are known. Each dowel hole can be configured to receive and hold a dowel, such as with threading to engage with threading of the dowel, or with a cavity configured to maintain the dowel in the cavity.

In some embodiments, the plurality of calibration fiducial markers 112 can be configured to be inserted into the datum holes (by way of dowels or other structure) such that each such calibration fiducial marker has one or more degrees-of-freedom of movement/rotation (e.g., about the z-axis—namely, a longitudinal axis of the dowel). In alternative embodiments, the plurality of calibration fiducial markers 112 can be configured to be inserted into the datum holes such that each such calibration fiducial marker has no degrees-of-freedom of movement/rotation. Furthermore, each bracket can be configured to fasten to a fiducial marker (e.g., a plate or sheet having a checkerboard pattern) or can be configured with a slot into which the fiducial marker can be inserted, among other possible manners of holding the fiducial marker.

FIG. 3 depicts an example of a fiducial marker 142, a bracket 144, and a dowel 146. As shown, the dowel 146 takes the form of a dowel screw, but in alternative embodiments, the dowel 146 can take other forms, such as a cylindrical dowel without any screw threading.

Example operations for calibrating fiducial markers relative to the workpiece 104 will now be described in more detail. As noted above, the one or more cameras 108 acquire the set of images 120 of the fiducial markers 102. For example, the one or more cameras 108 can acquire the set of images 120 such that each image of the set of images 120 includes, at a minimum, at least one calibration fiducial marker of the plurality of calibration fiducial markers 112. As another example, the one or more cameras 108 can acquire the set of images 120 such that each image of the set of images 120 includes at least one of the one or more first fiducial markers 110 and at least one of the plurality of calibration fiducial markers 112 in the same field of view of the one or more cameras 108. That is, when a camera of the one or more cameras 108 acquires an image, at least one of each type of fiducial marker can be within the field of view of the camera.

As noted above, the computing device 106 receives the set of images 120 from the one or more cameras 108. The computing device 106 then estimates poses of the fiducial markers 102, which in an example involves, in each image of the set of images 120, the computing device 106 estimating, for each fiducial marker that is visible in the image, a pose of the fiducial marker relative to the one or more cameras 108. In other words, the computing device 106 estimates the pose of each fiducial marker in each image with respect to a camera frame from the camera pose at which the image was acquired. The poses of the fiducial markers 102 can then be used to formulate and solve a pose graph.

To facilitate estimation of the poses of the fiducial markers 102, for example, the computing device 106 can estimate the pose of a fiducial marker—that is, a pose of one of the one or more first fiducial markers 110 or a pose of one of the plurality of calibration fiducial markers 112—in the frame of a camera of the one or more cameras 108 for a particular image of the set of images 120 by detecting the fiducial marker in the image. One technique the computing device 106 can use to detect the fiducial marker in the image is to identify the corner points of the checkerboard pattern using a corner detection algorithm such as the Harris Corner Detector and/or other possible corner detection algorithms. The checkerboard patterns shown in FIGS. 2 and 3, for instance, include a solid black or other colored square border, and thus the corners of this border can be found. From there, given image coordinates for the corner points (pixels x/y) of the fiducial marker, the intrinsic matrix of the camera, and known physical dimensions of the fiducial marker, the fiducial marker in the frame of the camera can be estimated using an algorithm such as Perspective-n-Point, which is designed to help estimate the pose of a camera given a set of n 3D points in the world and corresponding 2D projections in the image. In alternative embodiments, other algorithms could be used. The computing device 106 can perform the process described above, or a variation thereof, for each fiducial marker visible in each image to determine a pose of each fiducial marker relative to the frame of the camera that captured the image.

Additionally, to help formulate the pose graph, the computing device 106 can prepare transforms for the plurality of calibration fiducial markers 112 relative to the origin of the workpiece 104. The act of preparing such transforms (referred to hereinafter as "calibration transforms," for brevity) can involve looking up, in reference data, the positions of the datum holes (and thus, the positions of the plurality of calibration fiducial markers 112) and applying an offset (e.g., from a dowel hole position to a center of a calibration fiducial marker) such that there exists, for each calibration fiducial marker, a calibration transform from the origin of the workpiece 104 (e.g., a global frame) to a center of the calibration fiducial marker, where a center of a particular fiducial marker is defined as a geometric center of the face of the fiducial marker and a reference position on the fiducial marker from which the computing device 106 measures fiducial detections (e.g., when estimating the pose of the fiducial marker with respect to a camera from an image). In some examples, the reference data can take the form of a computer-aided design (CAD) model of the workpiece 104 that specifies the locations of the datum holes, which are thus used by the computing device 106 to determine where the plurality of calibration fiducial markers 112 are located. The reference data can take other forms as well. From the reference data, the computing device 106 can also determine the pose of each calibration fiducial marker relative to the origin of the workpiece 104

Figure 4:
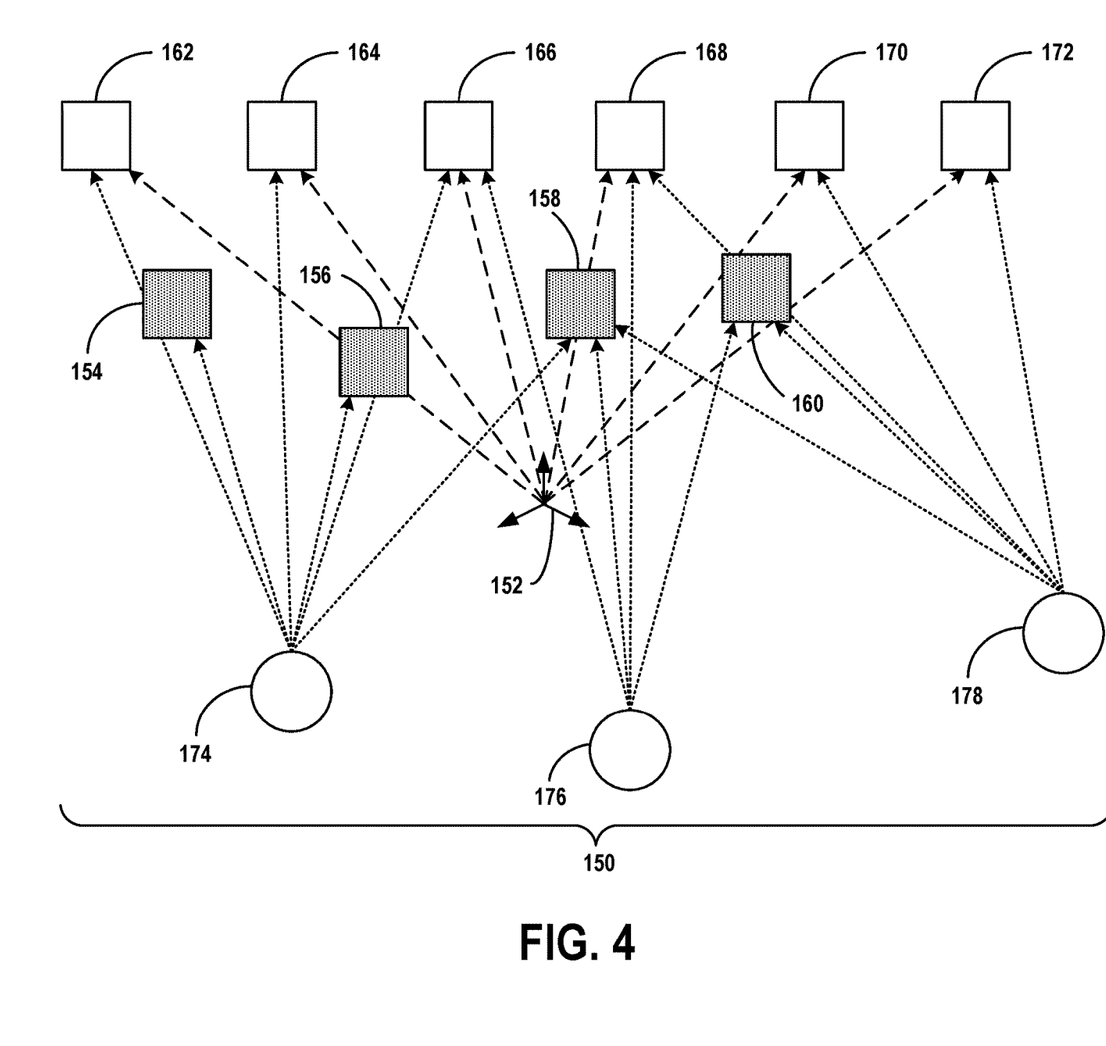
FIG. 4 depicts a pose graph, according to an example implementation.

FIG. 4 depicts an example of a pose graph 150, according to an example implementation. The terms "workpiece 104," "one or more first fiducial markers 110" and "plurality of calibration fiducial markers 112" will be used in describing FIG. 4, although FIG. 4 does not explicitly depict such elements. Rather, as described below, FIG. 4 depicts representations of some of such elements. For reference, the pose graph 150 is shown to include axes representing an origin 152 of the workpiece 104, although in practice, the pose graph 150 might not include the origin 152.

A pose graph (also known as a factor graph), such as the pose graph 150 shown in FIG. 4, can include (i) variables and (ii) constraints that relate two variables. Variables are also often referred to as "nodes." The pose graph 150 shown in FIG. 4 includes nodes for the set of images 120 and for the fiducial markers 102. In particular, the shaded squares shown in FIG. 4 represent nodes for the one or more first fiducial markers 110 and include node 154, node 156, node 158, and node 160. Further, the non-shaded squares shown in FIG. 4 represent nodes for the plurality of calibration fiducial markers 112 and include node 162, node 164, node 166, node 168, node 170, and node 172. Still further, the circles shown in FIG. 4 represent nodes for the set of images 120 and include node 174, node 176, and node 178, each of which corresponding to a respective different image acquired from a different camera pose.

The arrows between the nodes of the pose graph 150 represent constraints between respective pairs of nodes. For example, the dotted arrow lines represent constraints between the set of images 120 and the fiducial markers 102, which include (i) constraints between the one or more first fiducial markers 110 and the set of images 120 and (ii) constraints between the plurality of calibration fiducial markers 112 and the set of images 120. More particularly, for each image, a constraint exists between the node representing the image and each fiducial marker that is visible in the image. As further shown, the dashed arrow lines represent constraints between the origin 152 of the workpiece 104 and the plurality of calibration fiducial markers 112.

Any one or more of the constraints described above and shown in FIG. 4 can make up a set of constraints of the pose graph 150, which the computing device 106 can use to solve the pose graph 150.

Each constraint in the pose graph 150 is a six degrees-of-freedom transform with a covariance matrix representing the variance of noise in each dimension. The variance is expressed as the standard deviation of a Gaussian normal distribution, and is representative of uncertainty (e.g., how much the measurement in each dimension can be trusted), where lower variance is less uncertain and higher variance is more uncertain. In some embodiments, each constraint between an image node and a fiducial marker node has a variance in each dimension which scales with the square of the distance between the fiducial marker and the camera. This can make the poses of the fiducial markers that are farther away from the camera less certain, but this can be helpful to do because fiducial marker detections become less accurate at a larger distance. Specifically, for the constraints between the plurality of calibration fiducial markers 112 and the origin 152 of the workpiece 104, there can be lower variance in five of the six degrees-of-freedom and a higher variance in the z-axis rotation, since the plurality of calibration fiducial markers 112 are able to rotate about the z-axis about their respective dowels. However, in alternative embodiments, the plurality of calibration fiducial markers 112 could be temporarily attached or disposed in/on the workpiece 104 in such a way that lowers the variance in all six degrees-of-freedom. Because each constraint has some level of uncertainty associated with one or more degrees-of-freedom, there is an associated uncertainty of each pose that is estimated for the fiducial markers 102. As such, the act of solving the pose graph 150 can be based on the poses estimated for the fiducial markers 102 and further based on an associated uncertainty of each of the poses estimated for the fiducial markers 102.

Each node of the pose graph 150 has an associated state vector, which represents a pose of that node. For example, a state vector of a node for a captured image can represent a pose of the camera at which the image was captured, and a state vector of a node for a fiducial marker can represent a pose of the fiducial marker. A pose represented by a state vector can be a pose relative to the origin 152 of the workpiece 104. The process of the computing device 106 solving the pose graph 150 involves optimizing the state vectors, and thus the poses, of at least the one or more first fiducial markers 110, and perhaps additionally the state vectors of the plurality of calibration fiducial markers 112 and/or the state vectors of the set of images 120. Further, the framework for the pose graph 150 can estimate a 36 (6x6) parameter multivariate Gaussian distribution for each state vector.

The process of formulating the pose graph 150 can involve initializing at least some of the nodes' state vectors—that is, using known data associated with a node as an initial state vector for that node. For example, the nodes of each of the one or more first fiducial markers 110, as well as the nodes of each of the set of images 120, are uninitialized because their poses are unknown, whereas the nodes of each of the plurality of calibration fiducial markers 112 are initialized based on the known pose information of each calibration fiducial marker with respect to the origin 152 of the workpiece 104. If the reference data described above (e.g., CAD data) is deemed to be reliable (e.g., by a human operator tasked with analyzing the reference data, or by a computing device configured to intelligently analyze the reference data for accuracy), the computing device 106 can hold state vectors for the plurality of calibration fiducial markers 112 can be held static during optimization. Alternatively, the computing device 106 can decide or be instructed to optimize the state vectors for the plurality of calibration fiducial markers 112 along with the state vectors of the one or more first fiducial markers 110 (and perhaps additionally the state vectors of the set of images 120), such as when there is a threshold high likelihood of margins of error for the dowel hole locations in the reference data.

The computing device 106 can be configured to treat the plurality of calibration fiducial markers 112 are treated as landmarks with known poses. In existing processes, the term "landmark" generally refers to a feature that can be uniquely identified, but in the context of the disclosed method and system, the term landmark refers to a feature for which a pose is known before solving the pose graph 150.

Additionally, in formulating the pose graph 150, the state vectors of the nodes for the set of images 120 (e.g., the poses of the one or more cameras 108 that acquired the set of images 120) can be initialized with estimations for the plurality of camera poses from which the set of images 120 were acquired. To estimate these camera poses, the computing device 106 can, for each image, estimate a camera pose from which a camera of the one or more cameras 108 acquired the image by multiplying, for each calibration fiducial marker visible in the image, an estimated pose of the calibration fiducial marker relative to the camera of the one or more cameras 108 by a respective transform associated with a known pose of the calibration fiducial marker relative to the origin 152—namely, one of the calibration transforms that the computing device 106 prepared. The result of this is an inference, or estimate, of each of the camera poses. As such, solving the pose graph 150 will optimize the initial estimated camera poses to satisfy the set of constraints.

Additionally, in formulating the pose graph 150, the constraints shown in FIG. 4 are added to the pose graph 150. To facilitate this, for each fiducial marker visible in each image, the computing device 106 identifies a corresponding node using a unique identifier for the fiducial marker (e.g., a barcode encoding or other encoding on a face of the fiducial marker that corresponds to a unique integer by which the fiducial marker can be identified) and adds a constraint between that node and a node for the image (e.g., node 174, node 176, or node 178) in which the fiducial marker was identified.

Once the computing device 106 has formulated the pose graph 150 in the manner described above, the computing device 106 solves the pose graph 150. Because solving the pose graph 150 involves optimizing the poses estimated for the fiducial markers 102, solving the pose graph 150 solves for accurate poses of at least the one or more first fiducial markers 110, and perhaps additionally accurate poses of the one or more cameras 108 that acquired the set of images 120. In response to solving for the various poses, the computing device 106 can, in some examples, perform various operations, such as preparing a data package comprising all of the solved-for poses and transmitting the data package to one or more other computing devices. For example, the computing device 106 can send the data package to a control system for a robot that is tasked with interacting with the workpiece 104. As another example, the computing device 106 can send the data package to an AR wearable computing device, which can allow the AR wearable computing device to project a CAD drawing of the workpiece 104 over the real-world version of the workpiece 104. Other examples are possible as well.

Additionally or alternatively, based on the solved-for poses, the computing device 106 can control operation of a robotic device (e.g., robotic device 119). For example, the computing device 106 can control the robotic device to sand the workpiece 104, grip the workpiece 104 using a robotic arm and gripper, move the workpiece 104, drill, paint, or weld the workpiece 104, and/or change its orientation and position in the environment relative to the workpiece 104. In an embodiment where the computing device 106 is remotely located from the robotic device and separate from an onboard computing device of the robotic device, the act of controlling the robotic device can involve the computing device 106 transmitting, to the onboard computing device, an instruction that, upon receipt of the instruction by the onboard computing device, causes the onboard computing device to control the robotic device to perform one or more operations indicated in the instruction. Other examples of controlling the robotic device to perform operations are possible as well.

The above-described use of fiducial markers with poses that are known before optimization (e.g., the plurality of calibration fiducial markers 112) can help the computing device 106 accurately and more quickly solve for poses of the one or more first fiducial markers 110 and the poses of the one or more cameras 108 that acquired the set of images 120. Further, as a result of the efficiently determination of high-accuracy poses, precise operations, such as manufacturing tasks (e.g., sanding the workpiece 104) can be performed with respect to the workpiece 104.

Figure 5:
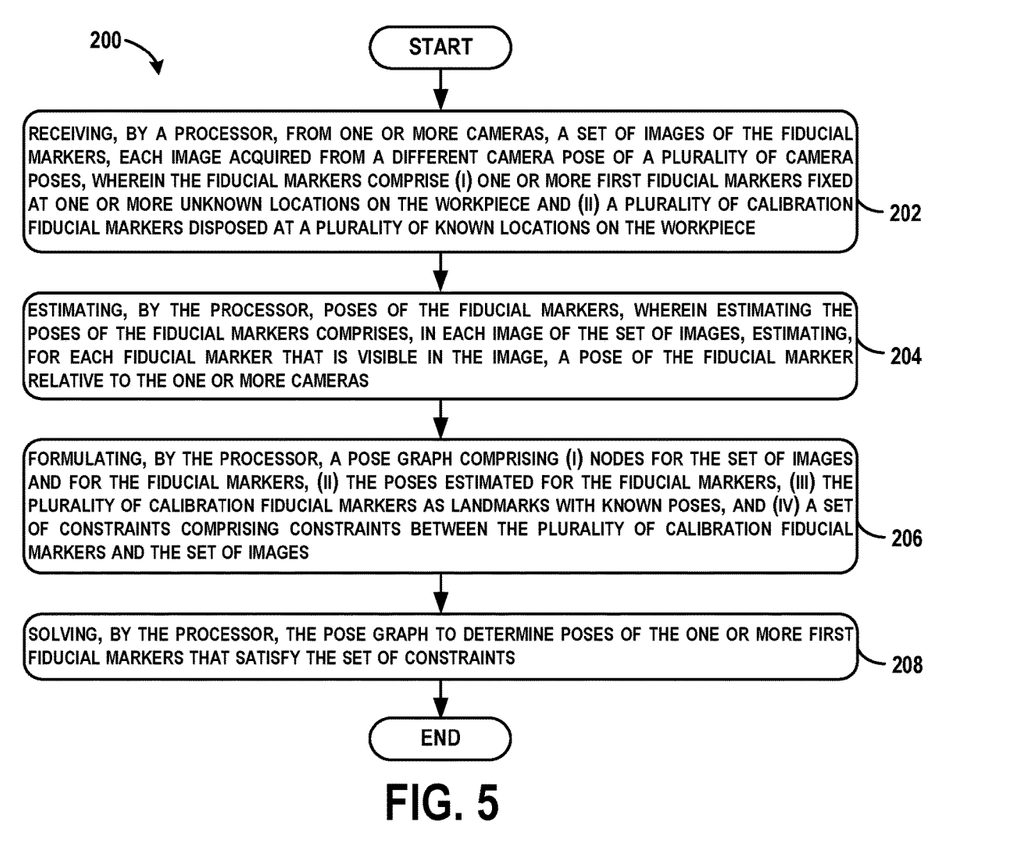
FIG. 5 shows a flowchart of an example method for calibrating fiducial markers relative to a workpiece, according to an example implementation.

FIG. 5 shows a flowchart of an example of a method 200 that could be used with the system 100 and associated components shown in FIGS. 1, 2, 3, and 4. Method 200 includes operations, functions, or actions as illustrated by one or more of blocks 202-208.

At block 202, the method 200 includes receiving, by a processor, from one or more cameras, a set of images of the fiducial markers, each image acquired from a different camera pose of a plurality of camera poses, where the fiducial markers comprise (i) one or more first fiducial markers fixed at one or more unknown locations on the workpiece and (ii) a plurality of calibration fiducial markers disposed at a plurality of known locations on the workpiece.

At block 204, the method 200 includes estimating, by the processor, poses of the fiducial markers, where estimating the poses of the fiducial markers comprises, in each image of the set of images, estimating, for each fiducial marker that is visible in the image, a pose of the fiducial marker relative to the one or more cameras.

At block 206, the method 200 includes formulating, by the processor, a pose graph comprising (i) nodes for the set of images and for the fiducial markers, (ii) the poses estimated for the fiducial markers, (iii) the plurality of calibration fiducial markers as landmarks with known poses, and (iv) a set of constraints comprising constraints between the plurality of calibration fiducial markers and the set of images.

At block 208, the method 200 includes solving, by the processor, the pose graph to determine poses of the one or more first fiducial markers that satisfy the set of constraints.

Figure 6:
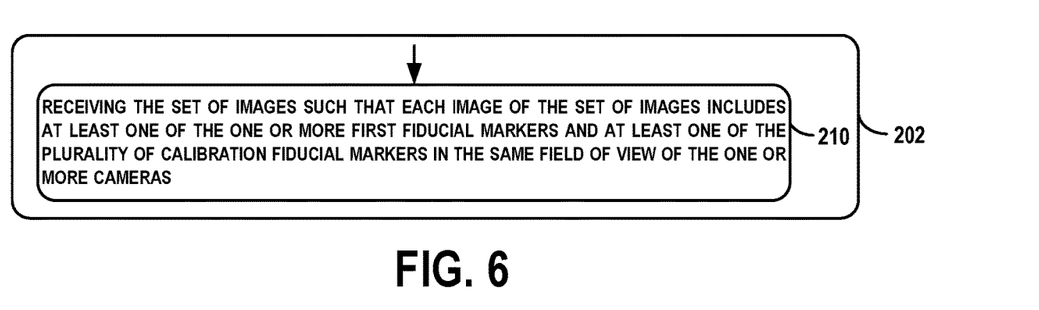
FIG. 6 shows a flowchart of an example method for performing the receiving function of the method of FIG. 5, according to an example implementation.

FIG. 6 shows a flowchart of an example method for performing the receiving as shown in block 202. At block 210, functions include receiving the set of images such that each image of the set of images includes at least one of the one or more first fiducial markers and at least one of the plurality of calibration fiducial markers in the same field of view of the one or more cameras.

Figure 7:
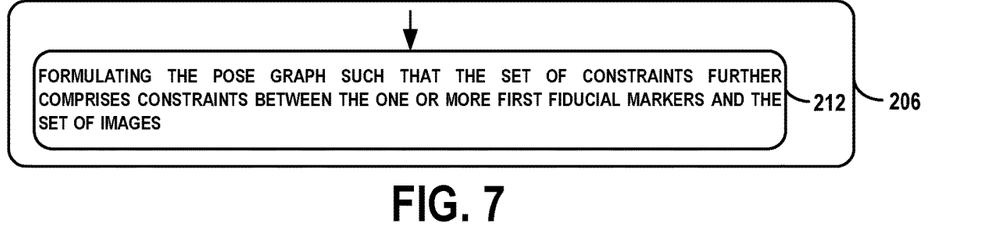
FIG. 7 shows a flowchart of an example method for performing the formulating function of the method of FIG. 5, according to an example implementation.

FIG. 7 shows a flowchart of an example method for performing the formulating shown in block 206. At block 212, functions include formulating the pose graph such that the set of constraints further comprises constraints between the one or more first fiducial markers and the set of images.

Figure 8:
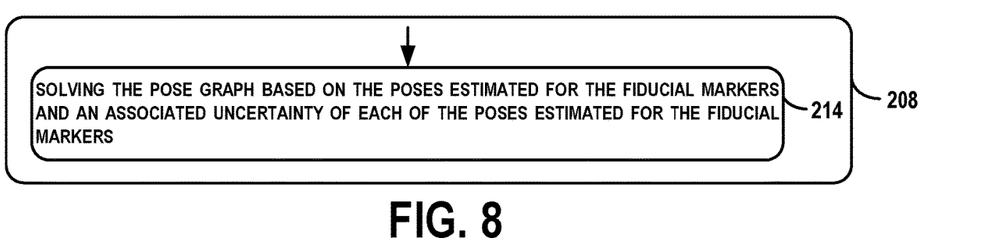
FIG. 8 shows a flowchart of an example method for performing the solving function of the method of FIG. 5, according to an example implementation.

FIG. 8 shows a flowchart of an example method for performing the solving shown in block 212. At block 214, functions include solving the pose graph based on the poses estimated for the fiducial markers and an associated uncertainty of each of the poses estimated for the fiducial markers.

Figure 9:
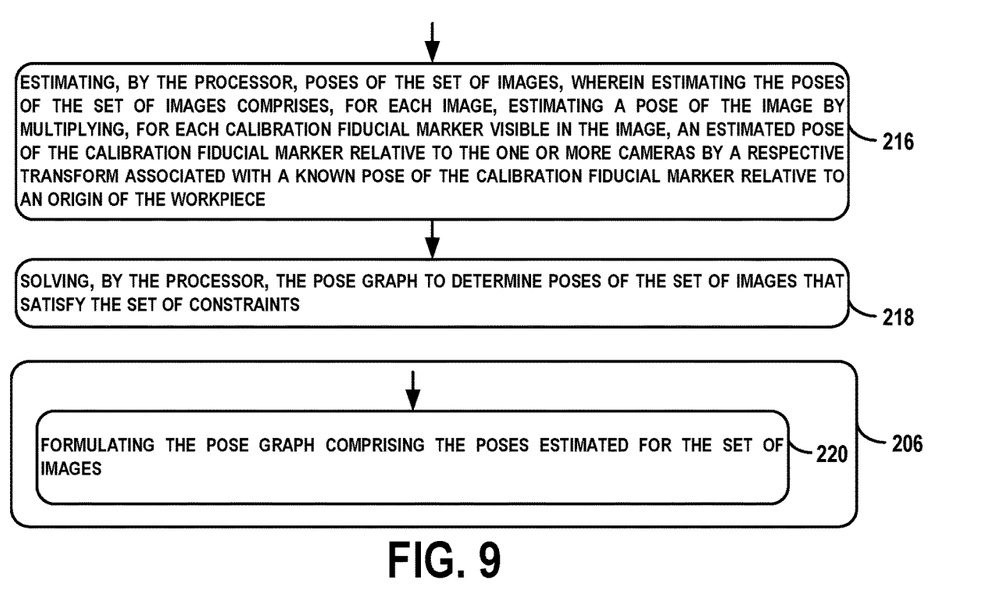
FIG. 9 shows a flowchart of an example method for use with the method of FIG. 5, as well as a flowchart of an example method for performing the formulating function of the method of FIG. 5, according to an example implementation.

FIG. 9 shows a flowchart of an example method for use with the method 200. At block 216, functions include estimating, by the processor, poses of the set of images, where estimating the poses of the set of images comprises, for each image, estimating a pose of the image by multiplying, for each calibration fiducial marker visible in the image, an estimated pose of the calibration fiducial marker relative to the one or more cameras by a respective transform associated with a known pose of the calibration fiducial marker relative to an origin of the workpiece. And at block 218, functions include solving, by the processor, the pose graph to determine poses of the set of images that satisfy the set of constraints. Additionally, FIG. 9 shows a flowchart of an example method for performing the formulating shown in block 206. At block 220, functions include formulating the pose graph comprising the poses estimated for the set of images.

Figure 10:
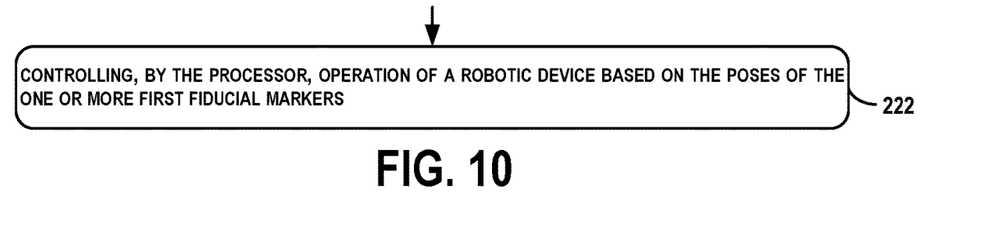
FIG. 10 shows a flowchart of another example method for use with the method of FIG. 5, according to an example implementation.

FIG. 10 shows a flowchart of another example method for use with the method 200. At block 222, functions include controlling, by the processor, operation of a robotic device based on the poses of the one or more first fiducial markers. In some embodiments, after calibration is complete, a user or robotic device can remove the plurality of calibration fiducial markers and the poses of the one or more first fiducial markers can then be used by the robotic device during performance of certain operations such as sanding, cleaning, painting, etc. As such, the act of controlling operation of the robotic device based on the poses of the one or more first fiducial markers can be performed after the plurality of calibration fiducial markers are removed. In alternative embodiments, however, such controlling can occur while at least one calibration fiducial marker is still present on the workpiece. The operations can be performed at other times as well.

Devices or systems may be used or configured to perform logical functions presented in FIGS. 5, 6, 7, 8, 9, and 10. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Although blocks in FIGS. 5, 6, 7, 8, 9, and 10, are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for these and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIGS. 5, 6, 7, 8, 9, and 10 may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A calibration system for calibrating poses of fiducial markers relative to a workpiece, the calibration system comprising:
the workpiece;
the fiducial markers, wherein the fiducial markers comprise:
(i) one or more first fiducial markers coupled at one or more unknown fixed locations on the workpiece, wherein each first fiducial marker displays a first type of machine-readable label, and
(ii) a plurality of calibration fiducial markers disposed at a plurality of known locations on the workpiece in a temporary manner, wherein each calibration fiducial marker displays a second type of machine-readable label, and wherein the plurality of known locations are based on a three-dimensional (3D) model of the workpiece;
one or more cameras configured to acquire a set of images of the fiducial markers, wherein each image is acquired by the one or more cameras at a different camera pose of a plurality of camera poses; and
a processor configured to:
receive, from the one or more cameras, the set of images;
detect, in the set of images, the one or more first fiducial markers coupled at the one or more unknown fixed locations on the workpiece based the first type of machine-readable label and the plurality of calibration fiducial markers disposed at the plurality of known locations on the work piece based on the second type of machine-readable label;
estimate poses of the fiducial markers based on detecting the one or more first fiducial markers and the plurality of calibration fiducial markers, wherein for each image of the set of images, a pose of each fiducial marker that is visible in the image is estimated relative to the one or more cameras;
formulate a pose graph comprising (i) nodes for the set of images and for the fiducial markers, (ii) the poses estimated for the fiducial markers, (iii) the plurality of calibration fiducial markers as landmarks with known poses, and (iv) a set of constraints between the set of images and the plurality of calibration fiducial markers; and
solve the pose graph to determine poses of the one or more first fiducial markers relative to the work piece that satisfy the set of constraints.

2. The calibration system of claim 1, further comprising:
a plurality of brackets, each bracket configured to hold one of the plurality of calibration fiducial markers and having a dowel configured for insertion into a datum hole disposed in the workpiece.

3. The calibration system of claim 2, wherein the plurality of brackets are disposed in datum holes in the workpiece.

4. The calibration system of claim 1, wherein each image of the set of images includes at least one of the one or more first fiducial markers and at least one of the plurality of calibration fiducial markers in the same field of view of the one or more cameras.

5. The calibration system of claim 1, wherein formulating the pose graph comprising the set of constraints comprises formulating the pose graph such that the set of constraints further comprises constraints between the one or more first fiducial markers and the set of images.

6. The calibration system of claim 1, wherein solving the pose graph comprises solving the pose graph based on the poses estimated for the fiducial markers and an associated uncertainty of each of the poses estimated for the fiducial markers.

7. The calibration system of claim 1, wherein the processor is further configured to:
estimate the plurality of camera poses, wherein estimating the plurality of camera poses comprises, for each image, estimating a camera pose from which the one or more cameras acquired the image by multiplying, for each calibration fiducial marker visible in the image, an estimated pose of the calibration fiducial marker relative to the one or more cameras by a respective transform associated with a known pose of the calibration fiducial marker relative to an origin of the workpiece; and
solve the pose graph to determine the plurality of camera poses that satisfy the set of constraints,
wherein formulating the pose graph comprises formulating the pose graph comprising the plurality of camera poses that were estimated.

8. A method for calibrating poses of fiducial markers relative to a workpiece, the method comprising:
receiving, by a processor and from one or more cameras, a set of images of the fiducial markers, wherein each image is acquired by the one or more cameras at a different camera pose of a plurality of camera poses, wherein the fiducial markers comprise (i) one or more first fiducial markers coupled at one or more unknown fixed locations on the workpiece and (ii) a plurality of calibration fiducial markers disposed at a plurality of known locations on the workpiece in a temporary manner, wherein each first fiducial marker displays a first type of machine-readable label and each calibration fiducial marker displays a second type of machine-readable label, and wherein the plurality of known locations are based on a three-dimensional (3D) model of the workpiece;
detecting, in the set of images, the one or more first fiducial markers coupled at the one or more unknown fixed locations on the workpiece based on the first type of machine-readable label and the plurality of calibration fiducial markers disposed at the plurality of known locations on the work piece based on the second type of machine-readable label;
estimating, by the processor, poses of the fiducial markers based on detecting the one or more first fiducial markers and the plurality of calibration fiducial markers, wherein for each image of the set of images, a pose of each fiducial marker that is visible in the image is estimated relative to the one or more cameras;
formulating, by the processor, a pose graph comprising (i) nodes for the set of images and for the fiducial markers, (ii) the poses estimated for the fiducial markers, (iii) the plurality of calibration fiducial markers as landmarks with known poses, and (iv) a set of constraints between the set of images and the plurality of calibration fiducial markers; and solving, by the processor, the pose graph to determine poses of the one or more first fiducial markers relative to the work piece that satisfy the set of constraints.

9. The method of claim 8, wherein receiving the set of images of the fiducial markers comprises receiving the set of images such that each image of the set of images includes at least one of the one or more first fiducial markers and at least one of the plurality of calibration fiducial markers in the same field of view of the one or more cameras.

10. The method of claim 8, wherein formulating the pose graph comprising the set of constraints comprises formulating the pose graph such that the set of constraints further comprises constraints between the one or more first fiducial markers and the set of images.

11. The method of claim 8, wherein solving the pose graph comprises solving the pose graph based on the poses estimated for the fiducial markers and an associated uncertainty of each of the poses estimated for the fiducial markers.

12. The method of claim 8, further comprising:
estimating, by the processor, poses of the set of images, wherein estimating the poses of the set of images comprises, for each image, estimating a pose of the image by multiplying, for each calibration fiducial marker visible in the image, an estimated pose of the calibration fiducial marker relative to the one or more cameras by a respective transform associated with a known pose of the calibration fiducial marker relative to an origin of the workpiece; and
solving, by the processor, the pose graph to determine poses of the set of images that satisfy the set of constraints,
wherein formulating the pose graph comprises formulating the pose graph comprising the poses estimated for the set of images.

13. The method of claim 8, further comprising:
controlling, by the processor, operation of a robotic device based on the poses of the one or more first fiducial markers.

14. A non-transitory computer readable medium having stored thereon instructions, that when executed by one or more processors of a computing device, cause the computing device to perform operations comprising:
receiving, from one or more cameras, a set of images of the fiducial markers, wherein each image is acquired by the one or more cameras at a different camera pose of a plurality of camera poses, wherein the fiducial markers comprise (i) one or more first fiducial markers coupled at one or more unknown fixed locations on a workpiece and (ii) a plurality of calibration fiducial markers disposed at a plurality of known locations on the workpiece in a temporary manner, wherein each first fiducial marker displays a first type of machine-readable label and each calibration fiducial marker displays a second type of machine-readable label, and wherein the plurality of known locations are based on a three-dimensional (3D) model of the workpiece;
estimating poses of the fiducial markers based on detecting the one or more first fiducial markers and the plurality of calibration fiducial markers, wherein for each image of the set of images, a pose of each fiducial marker that is visible in the image is estimated relative to the one or more cameras;
formulating a pose graph comprising (i) nodes for the set of images and for the fiducial markers, (ii) the poses estimated for the fiducial markers, (iii) the plurality of calibration fiducial markers as landmarks with known poses, and (iv) a set of constraints between the set of images and the plurality of calibration fiducial markers; and
solving the pose graph to determine poses of the one or more first fiducial markers relative to the work piece that satisfy the set of constraints.

15. The non-transitory computer readable medium of claim 14, wherein the plurality of calibration fiducial markers are held by a plurality of brackets, each bracket configured to hold one of the plurality of calibration fiducial markers and having a dowel configured for insertion into a datum hole disposed in the workpiece.

16. The non-transitory computer readable medium of claim 15, wherein the plurality of brackets are disposed in datum holes in the workpiece.

17. The non-transitory computer readable medium of claim 14, wherein each image of the set of images includes at least one of the one or more first fiducial markers and at least one of the plurality of calibration fiducial markers in the same field of view of the one or more cameras.

18. The non-transitory computer readable medium of claim 14, wherein formulating the pose graph comprising the set of constraints comprises formulating the pose graph such that the set of constraints further comprises constraints between the one or more first fiducial markers and the set of images.

19. The non-transitory computer readable medium of claim 14, wherein solving the pose graph comprises solving the pose graph based on the poses estimated for the fiducial markers and an associated uncertainty of each of the poses estimated for the fiducial markers.

20. The non-transitory computer readable medium of claim 14, the operations further comprising:
estimating the plurality of camera poses, wherein estimating the plurality of camera poses comprises, for each image, estimating a camera pose from which the one or more cameras acquired the image by multiplying, for each calibration fiducial marker visible in the image, an estimated pose of the calibration fiducial marker relative to the one or more cameras by a respective transform associated with a known pose of the calibration fiducial marker relative to an origin of the workpiece; and
solving the pose graph to determine the plurality of camera poses that satisfy the set of constraints,
wherein formulating the pose graph comprises formulating the pose graph comprising the plurality of camera poses that were estimated.

* * * * *